United States Patent [19]
Foushee

[11] Patent Number: 6,070,792
[45] Date of Patent: Jun. 6, 2000

[54] REUSABLE ENVELOPE

[75] Inventor: Fred Foushee, Suwanee, Ga.

[73] Assignee: Rock-Tenn Company, Norcross, Ga.

[21] Appl. No.: 09/158,237

[22] Filed: Sep. 22, 1998

[51] Int. Cl.[7] .................................................. B65D 27/06
[52] U.S. Cl. ............................... 229/302; 229/80; 229/82
[58] Field of Search ............................ 229/302, 80, 82, 229/75

[56] References Cited

U.S. PATENT DOCUMENTS

| | | | |
|---|---|---|---|
| 594,620 | 11/1897 | Harris | 229/82 |
| 884,174 | 4/1908 | Longtoft | 229/82 |
| 911,800 | 2/1909 | Ahlstrom | 229/82 |
| 913,987 | 3/1909 | Simmons | 229/80 |
| 982,594 | 1/1911 | Griffin | 229/82 |
| 1,091,172 | 3/1914 | Thayer . | |
| 1,092,660 | 4/1914 | Michler | 229/82 |
| 1,145,935 | 7/1915 | Stenke . | |
| 1,285,238 | 11/1918 | Kramer | 229/82 |
| 1,649,591 | 11/1927 | Honigmaum | 229/82 |
| 1,870,908 | 8/1932 | Hahn . | |
| 1,888,313 | 11/1932 | Fiorenza . | |
| 1,935,192 | 4/1933 | Rossiter | 29/73 |
| 2,085,962 | 7/1937 | Farrell | 229/75 |
| 2,087,362 | 7/1937 | Swift | 229/75 |
| 2,182,261 | 12/1939 | Maas | 229/80 |
| 2,332,751 | 10/1943 | Powell | 229/73 |
| 2,828,065 | 3/1958 | Heywood | 229/85 |
| 2,931,559 | 4/1960 | Hilliard | 229/73 |
| 3,123,280 | 3/1964 | Currie | 229/75 |
| 3,270,948 | 9/1966 | Donovan | 229/73 |
| 3,498,528 | 3/1970 | Klein | 229/303 |
| 3,558,040 | 1/1971 | Krueger | 229/73 |
| 3,652,008 | 3/1972 | Grotefend | 229/85 |
| 3,702,171 | 11/1972 | Levine | 229/80 |
| 3,874,582 | 4/1975 | Wang | 229/73 |
| 3,942,714 | 3/1976 | Wise | 229/73 |
| 3,982,689 | 9/1976 | Retrum | 229/71 |
| 4,089,418 | 5/1978 | Yale | 206/632 |
| 4,180,168 | 12/1979 | Hiersteiner | 229/302 |
| 4,194,631 | 3/1980 | Rangan | 206/610 |
| 4,308,987 | 1/1982 | Solomon | 229/73 |
| 4,332,346 | 6/1982 | Kronman | 229/73 |
| 4,349,107 | 9/1982 | Pritchard | 229/82 |
| 4,565,317 | 1/1986 | Kranz | 229/73 |
| 4,595,138 | 6/1986 | Kristel | 229/73 |

FOREIGN PATENT DOCUMENTS

| | | | |
|---|---|---|---|
| 16529 | of 1903 | United Kingdom | 229/80 |
| 497296 | 12/1938 | United Kingdom | 229/80 |

*Primary Examiner*—Stephen P. Garbe
*Attorney, Agent, or Firm*—Schwegman, Lundberg, Woessner, & Kluth, P.A.

[57] ABSTRACT

A reusable envelope is formed from a unitary blank of material, such as paperboard. The envelope includes a front and back panel and first and second closure assemblies. Side panels define, in part, the pocket of the reusable envelope. The first closure assembly folds over a back portion of the envelope to seal during use. For re-use, the second closure assembly attaches also to the back portion of the envelope, leaving the front portion of the envelope free from damage as a result of opening the first and second closure assemblies.

15 Claims, 5 Drawing Sheets

REUSABLE ENVELOPE

FIELD OF THE INVENTION

The present invention relates to an envelope for holding objects therein and more specifically to a reusable envelope produced from a unitary blank of material.

BACKGROUND OF THE INVENTION

A common business practice is to provide a second self-addressed envelope within a first envelope sent to the addressee. However, providing the second envelope is an additional expense that is paid by the sender or passed on to the customer in the form of higher prices. Additional expense is incurred as clerical personnel are required to stuff the second envelope within the first envelope mailed to the address. Once the first envelope is opened, it becomes a waste item which is thrown away. Additional expense is also generated when the second self-addressed envelope is not provided, since the receiver must provide a separate return envelope.

To eliminate the need for a separate forwarding envelope and a separate return envelope for each original addressee, a remailable envelope has been described, which serve both the forwarding and the return function. One example of such an envelope is described in U.S. Pat. No. 3,558,040 to Krueger on Jan. 26, 1971. Another example of such an envelope is described in U.S. Pat. No. 4,308,987 to Solomon on Jan. 5, 1982. These two-way envelopes use a sealing flap carried by the front panel to seal on the back panel for a first use, and a resealing flap carried by the back panel of the forwarding envelope which folds over the top of the original envelope to seal on the front panel. The front panel, therefore, becomes obstructed and/or marred when the envelope is sealed and/or opened for the re-use. In addition, these two-way envelopes often require tedious manipulation by the original addressee to prepare the envelope and insertion for remailing resulting in misuse or damage to the return envelope.

However, such envelopes may also result in loosening of sealing strips, glue patches or loose edges being left on the envelope which interferes with machine sorting equipment on the return trip. The loose edges or the glue strips also interfere with the printing space on a single side of the envelope.

What is needed is an envelope which is reusable and produced from a single unitary material blank and is durable enough to be sent through the mail twice. What is also needed is an envelope which is compatible with existing automated processing machines. What is further needed is an envelope suitable for printing of sophisticated promotional material thereon without interference from the sealing features of the envelope.

SUMMARY OF THE INVENTION

A remailable envelope includes a front panel having two front panel side edges and top edge and a back panel having two back panel side edges and a top edge, the back panel defined in part by an exterior surface. In addition, the envelope has a first closure assembly hingedly coupled with the front panel along the top edge of the front panel and overlying for attachment to at least a portion of the back panel when the first closure assembly is sealed for a first mailing. A second closure assembly is also hingedly coupled with the back panel, where the second closure assembly coupled at a fold line offset from the back panel top edge.

The second closure assembly allows for sealing the envelope for a second mailing. In another embodiment, the first closure panel assembly comprises a closure panel and a first sealing panel each releasably coupled with a releasable strip. In one embodiment, the first sealing panel further comprises adhesive. In yet another embodiment, the second closure panel assembly includes a second sealing panel, a removable strip, and a resealing panel, where the second sealing panel is coupled with the removable strip, the removable strip is coupled with the resealing panel, and the resealing panel is coupled with the top edge of the back panel.

In another embodiment, a remailable envelope is provided which includes a front panel having two front panel side edges and top edge, and a back panel having two back panel side edges and a top edge, the back panel defined in part by an exterior surface. In addition, a first closure assembly hingedly coupled with the front panel along the top edge of the front panel and overlying for attachment to at least a portion of the back panel when the first closure assembly is sealed for a first mailing. The first closure panel assembly has a closure panel and a first sealing panel each releasably coupled with a releasable strip. Side panels are hingedly coupled with each front panel side edge disposed in overlying relation to the back panel. In addition, a second closure assembly hingedly coupled with the back panel, where the second closure assembly coupled at a fold line offset from the back panel top edge toward the bottom edge of the back panel. The second closure panel assembly comprises a second sealing panel, a removable strip, and a resealing panel, where the second sealing panel is coupled with the removable strip, the removable strip is coupled with the resealing panel, and the resealing panel is coupled with the top edge of the back panel. The second closure assembly allows for sealing the envelope for a second mailing.

In yet another embodiment, a one-piece material blank for forming a remailable envelope therefrom is provided. The blank includes a front panel having two front panel side edges and top edge, a back panel having two back panel side edges and a top edge, and two side panels each hingedly coupled with the front panel along the front panel side edges. A first closure assembly is hingedly coupled with the front panel along the top edge of the front panel, and a second closure assembly hingedly coupled with the back panel. The second closure assembly is coupled at a fold line offset from the back panel top edge towards the front panel. The second closure assembly allows for sealing the envelope for a second mailing.

In another embodiment, a method for forming a remailable envelope is provided, which includes folding a front panel toward a back panel, folding side panels hingedly attached to the front panel over the back panel, attaching the side panels to the back panel, folding a first closure assembly hingedly attached to the front panel over a second closure assembly hingedly attached to the back panel along a fold line offset from a top edge of the back panel, and attaching the first closure assembly to the back panel.

A reusable envelope is provided with which the addressee can reply to the sender by reusing the envelope submitted by the sender. The need for supplying the addressee with a second enclosed envelope is alleviated. A reusable envelope is provided which can be economically and efficiently manufactured. The remailable envelope does not require the use of a viewing window nor a properly printed and inserted addressing enclosure. The envelope can be opened with automatic or manual envelope opening device without destroying the remailability of the envelope. The envelope provides an unadultered surface suited for advertisements and the like which is not affected by the remailing features of the envelope.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

| Brief Description of the Drawings | |
|---|---|
| FIG. 1 | is an elevational view of an envelope constructed in accordance with one embodiment of the present invention. |
| FIG. 2 | is an elevational view of an envelope constructed in accordance with one embodiment of the present invention. |
| FIG. 3 | is an elevational view of an envelope constructed in accordance with one embodiment of the present invention. |
| FIG. 4 | is an elevational view of an envelope constructed in accordance with one embodiment of the present invention. |
| FIG. 5 | is an elevational view of an envelope constructed in accordance with one embodiment of the present invention. |
| FIG. 6 | is an elevational view of an envelope constructed in accordance with one embodiment of the present invention. |
| FIG. 7 | is an elevational view of an envelope constructed in accordance with one embodiment of the present invention. |
| FIG. 8 | is an elevational view of a blank for forming an envelope constructed in accordance with another embodiment of the present invention. |

DESCRIPTION OF THE PREFERRED EMBODIMENT

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
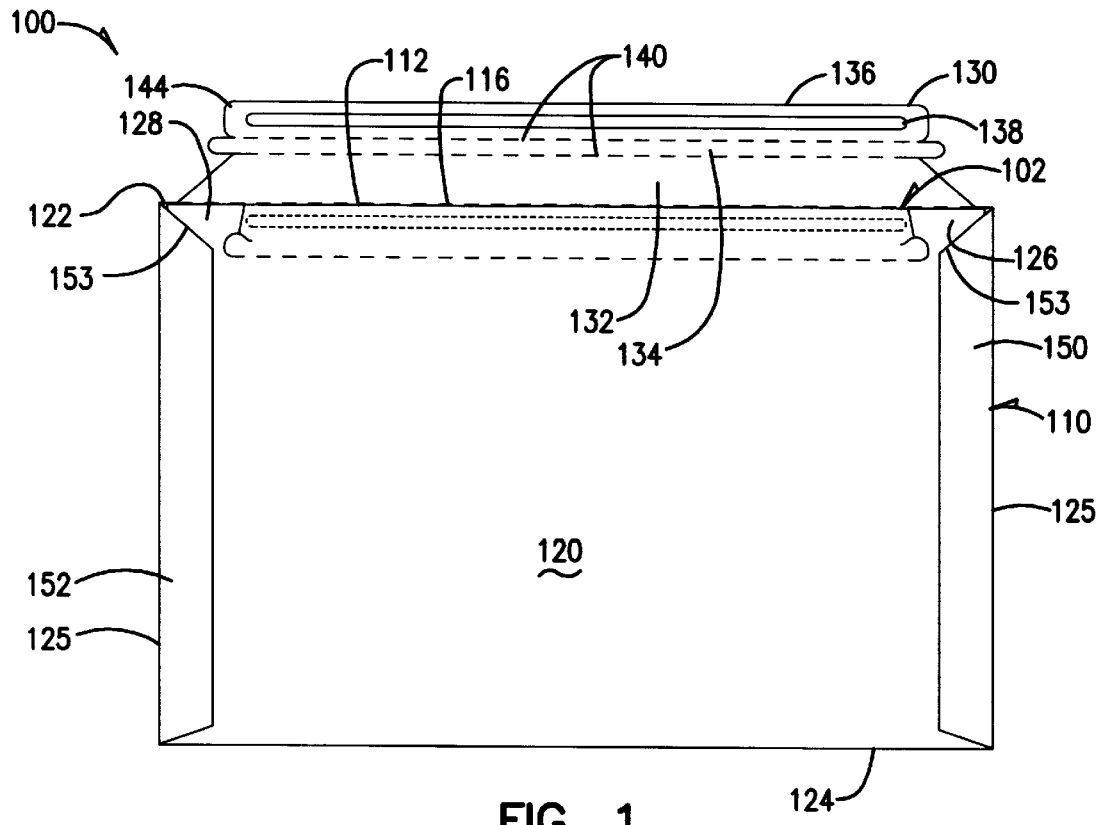

FIG. 1 illustrates a reusable envelope 100 constructed in accordance with one embodiment of the present invention. The envelope 100 is adapted to contain papers and other objects within a pocket 102 of the envelope 100. The envelope 100 is configured so that it can be sealed a first time, opened, and then resealed and opened a second time.

Figure 2:
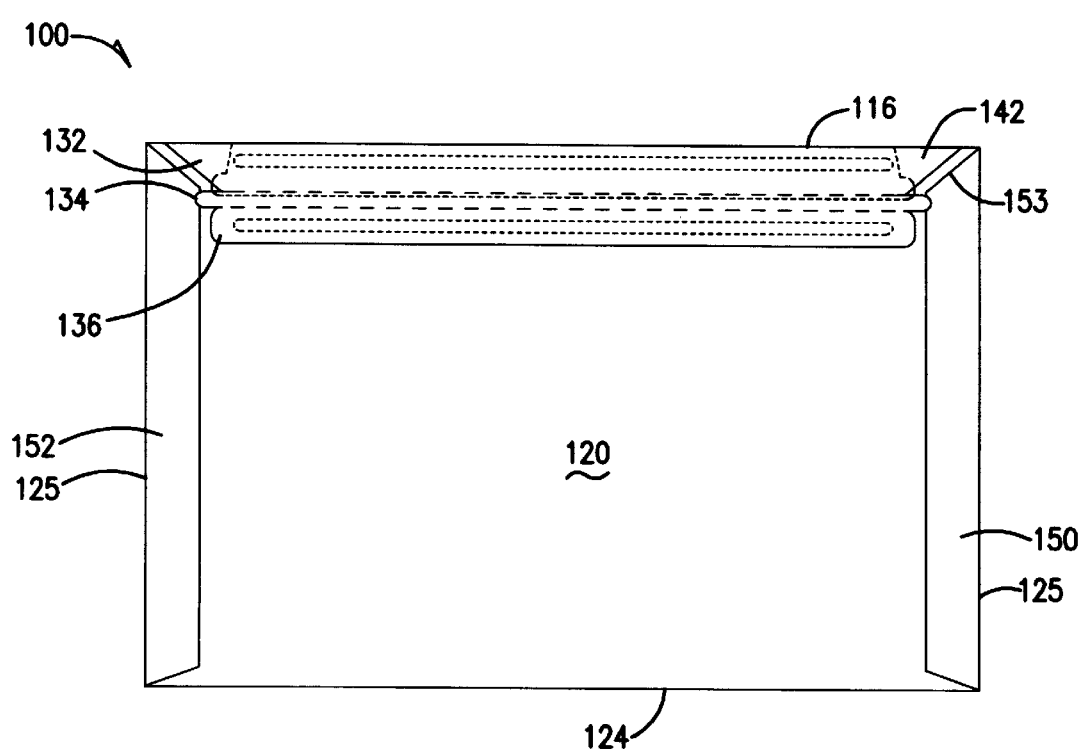

Referring to FIGS. 1 and 2, the envelope 100 includes a front panel 110 which is hingedly attached to a back panel 120 along a back panel bottom edge 124. Disposed along the sides of the envelope 100 are first and second side panels 150, 152, which are folded over the back panel 120. The first and second side panels 150, 152 each have a tapered top portion 153. The front panel 110, back panel 120, and the first and second panels 150, 152 define a pocket 102 for containing therein materials to be shipped.

The back panel 120 is defined by a top edge 122, a bottom edge 124, and side edges 125. The back panel 120 further includes a first support panel 126 and a second support panel 128, as will be further described below. Hingedly coupled with a top edge 112 of the front panel 110 is a first closure assembly 130.

The first closure assembly 130 is hingedly attached with the front panel 110 along a fold line 116. The first closure assembly 130 is adapted to fold over the back panel 120. The first closure assembly 130 comprises a closure panel 132, a releasable strip 134, and a first sealing panel 136. The first sealing panel 136 includes an adhesive strip 138 for attaching the first sealing panel 136 to the back panel 120. The closure panel 132 is defined by an exterior surface 142 (FIG. 2) and an interior surface 144, where the exterior surface 142 is exposed when the closure panel 132 is folded over the back panel 120, and the interior surface 144 faces toward the pocket 102. The closure panel 132 has tapered edges 133 which correspond with the tapered top portion 153 of the first and second side panels 150, 152.

The closure panel 132 is hingedly coupled with the releasable strip 134, and the releasable strip 134 is hingedly coupled with the first sealing panel 136 along partially perforated edges 140. Alternatively, these components can be hingedly coupled in other formats such as fold lines, cut lines, combinations of fold lines and cut lines, and their equivalents. The releasable strip 134 is releasably coupled between the closure panel 132 and the first sealing panel 136, such that it can be removed from the envelope 100, as will be further described below.

Figure 3:
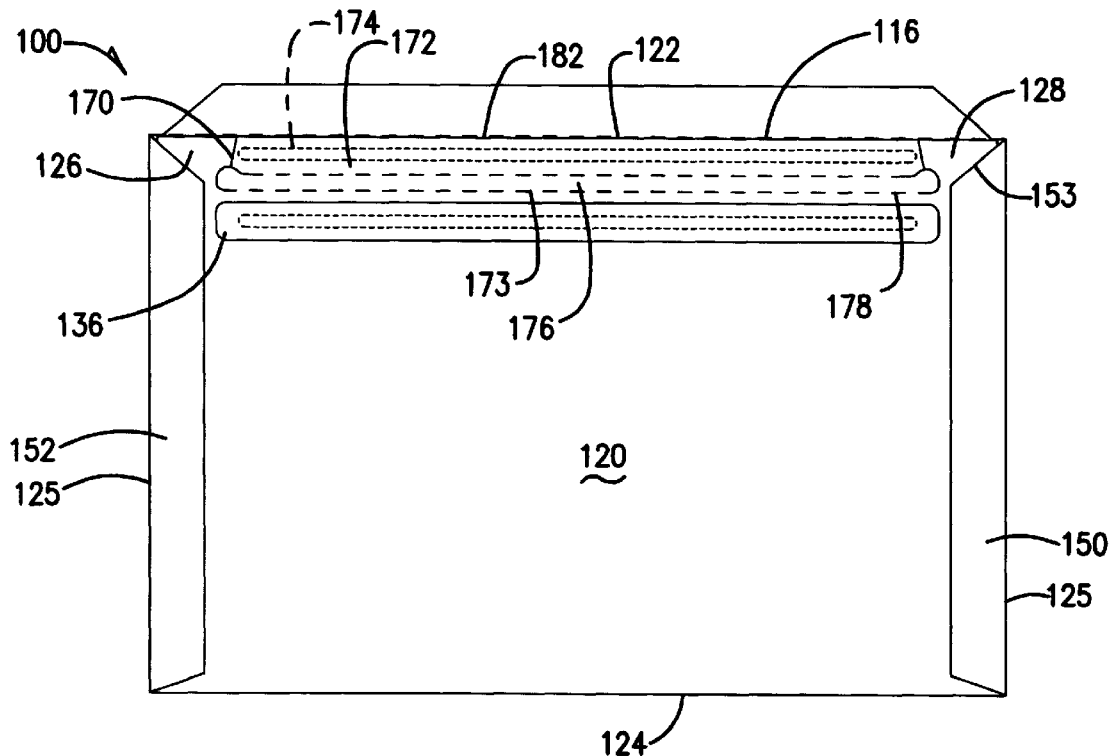
Figure 4:
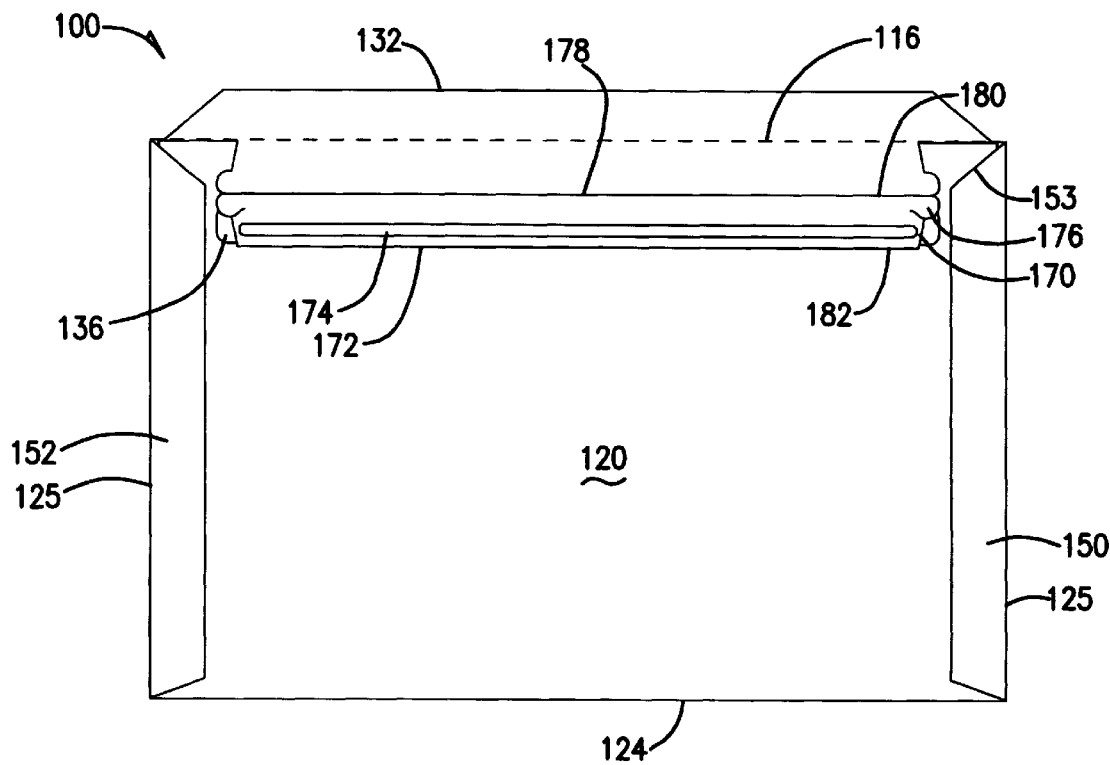
Figure 5:
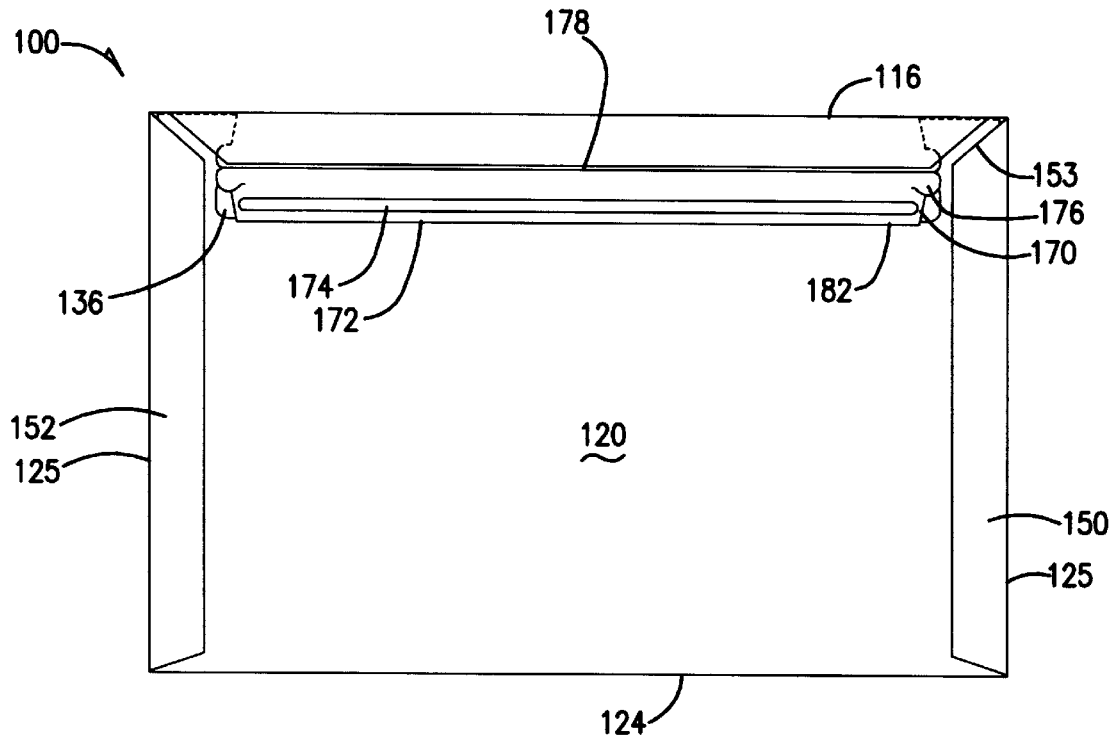

The envelope 100 further includes a second closure assembly 170, shown in more detail in FIGS. 3–5. The second closure assembly 170 is configured to seal the envelope 100 for remailing of the envelope 100. The second closure assembly 170 is disposed within a cut out 180 for the second closure assembly 170 and is hingedly coupled with the back panel 120 at a fold line 178. The fold line 178 is offset from the top edge 122 of the back panel 120 toward the bottom edge 124 of the back panel 120. The fold line 178 is offset such that a top edge 182 of the second closure assembly 170 is substantially even with the top edge 122 of the back panel 120. The second closure assembly 170 is disposed between the first support panel 126 and the second support panel 128 of the back panel 120.

The second closure assembly 170 includes a second sealing panel 172 which is disposed along the top edge 122 of the back panel 120. Hingedly coupled with the second sealing panel 172 is a releasable strip 176. The second sealing panel 172 is hingedly coupled with the releasable strip 176 along a partially perforated edge 173. Alternatively, the releasable strip 176 can be hingedly coupled in other formats such as fold lines, cut lines, combinations of fold lines and cut lines, and their equivalents. The releasable strip 176 is hingedly coupled along the fold line 178, and is releasable from the second sealing panel 172. The second closure assembly 170 is shorter from the top edge of the second closure assembly 182 to the fold line 178 than the first closure assembly 130. This allows for the first closure assembly 130 (FIGS. 1 and 2) to fold over the second closure assembly 170 during use.

Figure 8:
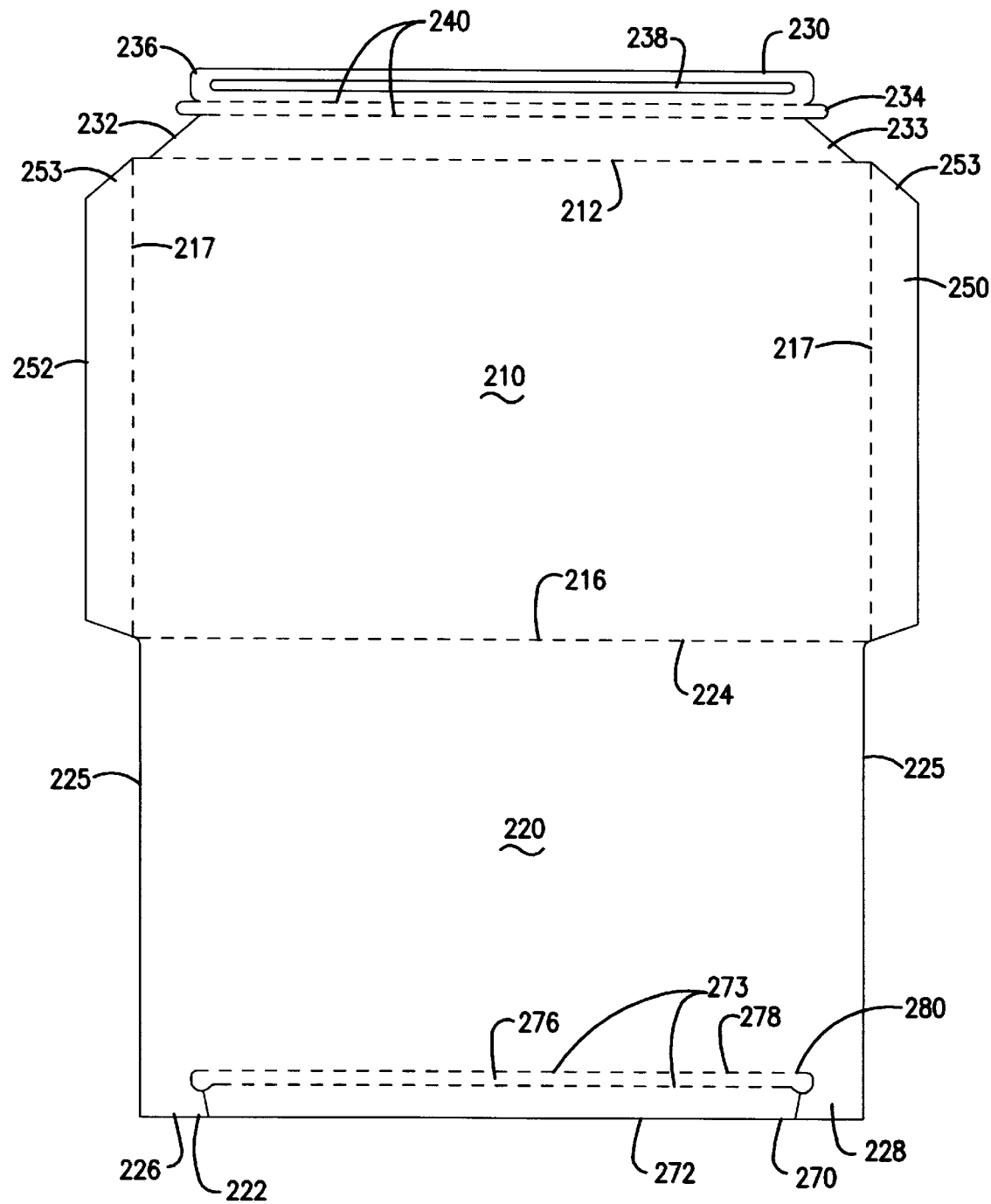

A blank for constructing the envelope 100 is illustrated in FIG. 8. The blank 200 is unitary and formed of paperboard material or other suitable material. A paperboard folder provides better protection for mailing use and re-use. The blank includes a front panel 210 which is hingedly coupled with a back panel 220 along a fold line 216. First and second side panels 250, 252 are hingedly coupled with side edges 217 of the front panel 210. The first and second side panels 250, 252 each have a tapered top portion 253. The back panel 220 is defined by a top edge 222, bottom edge 224, and side edges 225. The back panel 220 further includes a first support panel 226 and a second support panel 228, as will be further described below. Hingedly coupled with a top edge 212 of the front panel 210 is a first closure assembly 230.

The first closure assembly 230 includes a closure panel 132, a releasable strip 234, and a first sealing panel 236. The first sealing panel 236 includes an adhesive strip 238. The closure panel 232 also includes tapered edges 233 which correspond with the tapered top portion 253 of the first and second side panels 250, 252.

The closure panel 232 is hingedly coupled with the releasable strip 234, and the releasable strip 234 is hingedly coupled with the first sealing panel 236 along partially perforated edges 240. Alternatively these components can be hingedly coupled in other formats such as fold lines, cut lines, combinations of fold lines and cut lines, and their equivalents. The releasable strip 134 is releasably coupled between the closure panel 132 and the first sealing panel 136, such that it can be removed therefrom during use of the envelope.

The blank 200 further includes a second closure assembly 270 associated therewith. The second closure assembly 270 is configured to seal the envelope during re-use. A cut out 280 surrounds the second closure assembly 270 and the second closure assembly 270 is partially removed therefrom during use. The second closure assembly 270 is hingedly coupled with the back panel 220 at a fold line 278. The fold line 278 is offset from the top edge 222 of the back panel 220 toward the bottom edge 224 of the back panel 220. The fold line 278 is offset such that a top edge 282 of the second closure assembly 270 is substantially even with the top edge 222 of the back panel 220, when folded as discussed below. The second closure assembly 170 is disposed between the first support panel 126 and the second support panel 128 of the back panel 120.

The second closure assembly 270 includes a second sealing panel 272 which is disposed along the top edge 222 of the back panel 220. Hingedly coupled with the second sealing panel 272 is a releasable strip 276. The second sealing panel 272 is hingedly coupled with the releasable strip 276 along a partially perforated edge 273. Alternatively the releasable strip 276 can be hingedly coupled in other formats such as fold lines, cut lines, combinations of fold lines and cut lines, and their equivalents. The releasable strip 276 is hingedly coupled along the fold line 278, and is releasable from the second sealing panel 272.

To use and assemble the envelope 100 from the blank 200, the back panel 220 is folded toward the front panel 210. The first and second side panels 250, 252 are folded about the side edges 217 over the back panel 220 and are attached thereto. The side panels 250, 252 can be attached in a number of manners such as with adhesive, mechanical fasteners, tabs or slots, and other equivalents. The envelope 100 appears as that shown in FIG. 1 and is able to receive therein documents, papers and the like to be mailed within the envelope.

To close the envelope for the first mailing or use, the first closure assembly 130 is folded over the support panels 126, 128 and the top edge 122 of the back panel 120, as shown in FIG. 2. The envelope 100 is sealed or secured close using adhesive, mechanical fasteners, tabs or slots, and other equivalents. The recipient of the envelope 100 opens the first closure assembly 130 by removing the releasable strip 134 from the envelope 100, as shown in FIG. 3. The first sealing panel 136 remains attached to the back panel 120. The recipient can then remove the contents from within the envelope of the first mailing.

Figure 6:
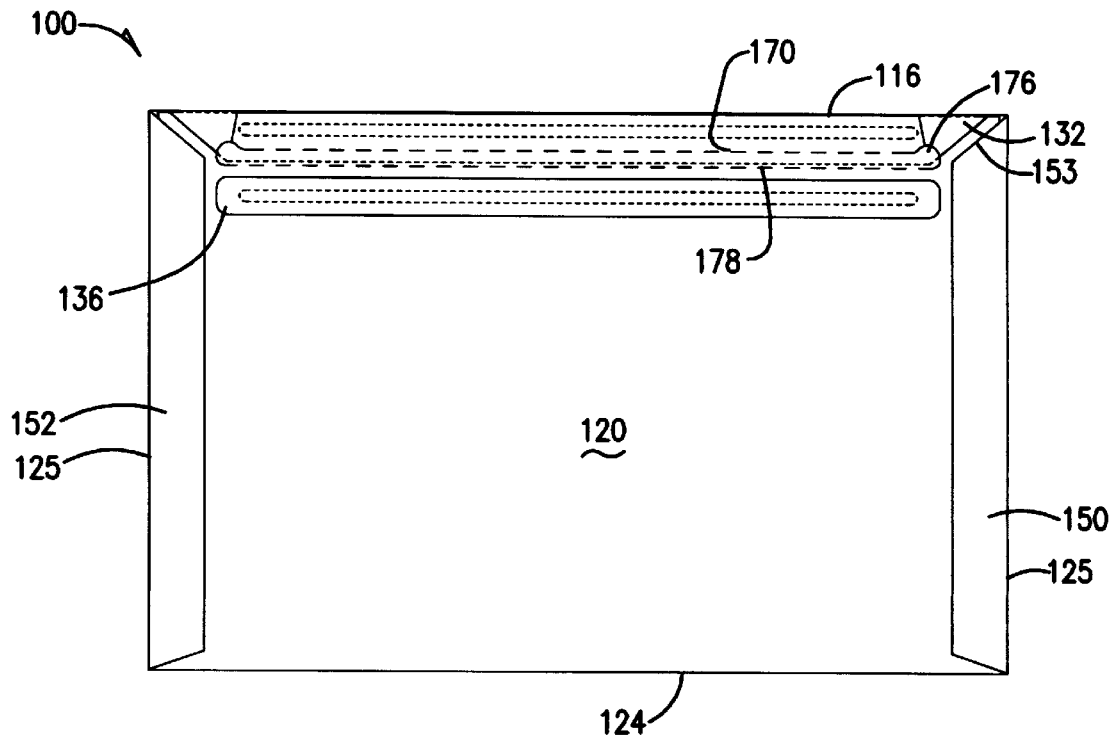
Figure 7:
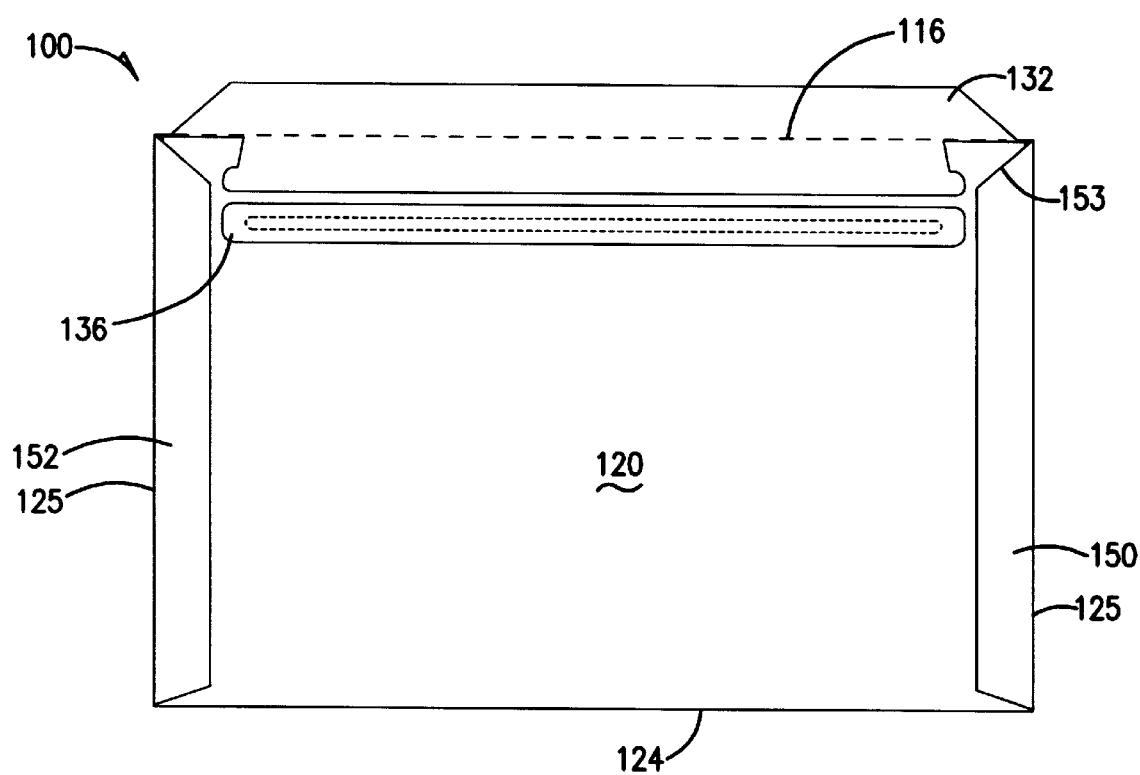

To use the envelope 100 for a second mailing or re-use, a user folds the second closure assembly 170 over the fold line 178, away from the front panel 110 and towards the bottom edge 124 of the back panel 120, as shown in FIG. 4. After new documents or other contents have been inserted into the envelope 100, the user closes the envelope by folding the closure panel 132 over the first and second support panels 126, 128 and the cut out 180, as shown in FIG. 5. The second closure assembly 170 is folded over the fold line 178 towards and over the closure panel 132, apd the second closure assembly 170 is attached to the closure panel 132, as illustrated in FIG. 6. Significantly, the second closure assembly 170 is attached to the closure panel 132 as it is folded over the back panel 120, leaving the front panel 110 free. The second sealing panel 172 is attached to the closure panel 132 in a number of manners such as with adhesive 174, mechanical fasteners, tabs or slots, and other equivalents. The envelope 100 is sealed or closed shut and is ready to be re-mailed. When the recipient receives the envelope 100, the second closure assembly 170 is released by removal of the releasable strip 176 (FIG. 6) and the closure panel 132 is released from the releasable strip 176 and opened, as shown in FIG. 7.

Advantageously, the envelope allows for easy reuse without damage to the envelope during mailing. The minimal folding required for use and reuse assists in preventing damage to the closure panels. The reusability features yield cost benefits since less envelopes are used. In addition, the blank for the reusable envelope requires less material, also providing a cost benefit. The front panel provides for sophisticated advertisement which will not become marred when the envelope is sealed and/or opened by a user.

It is to be understood that the above description is intended to be illustrative, and not restrictive. Many other embodiments will be apparent to those of ordinary skill in the art upon reading and understanding the above description. The panels may be formed of many different configurations without departing from the scope of the invention. The scope of the invention should, therefore, be determined with reference to the claims, along with the full scope of equivalents to which such claims will be entitled.

What is claimed is:

1. A remailable envelope comprising:
   a front panel having two front panel side edges and top edge;
   a back panel having two back panel side edges and a top edge, the back panel defined in part by an exterior surface;
   a first closure assembly hingedly coupled with the front panel along the top edge of the front panel and overlying for attachment to at least a portion of the back panel when the first closure assembly is sealed for a first mailing, where the first closure assembly comprises a closure panel and a first sealing panel each releasably coupled with a releasable strip; and
   a second closure assembly hingedly coupled with the back panel, the second closure assembly coupled at a fold line offset from the back panel top edge, the second closure assembly for sealing the envelope for a second mailing.

2. The envelope as recited in claim 1, further comprising side panels hingedly coupled with each front panel side edge disposed in overlying relation to the back panel.

3. The envelope as recited in claim 1, the first sealing panel further comprises adhesive disposed thereon.

4. The envelope as recited in claim 1, wherein the second closure assembly comprises a second sealing panel and a removable strip, where the second sealing panel is coupled with the removable strip.

5. The envelope as recited in claim 4, wherein the second sealing panel has adhesive material disposed thereon.

6. The envelope as recited in claim 1, wherein the front panel, back panel, first closure assembly and second closure assembly are all fabricated from a unitary blank of paperboard material.

7. The envelope as recited in claim 1, further comprising side panels hingedly coupled with each front panel side edge, wherein each side panel has a tapered top portion.

8. The envelope as recited in claim 7, wherein the closure panel has tapered edges corresponding with the tapered top portion of each side panel.

9. A remailable envelope comprising:

a front panel having two front panel side edges and top edge;

a back panel having two back panel side edges and a top edge, the back panel defined in part by an exterior surface;

a first closure assembly hingedly coupled with the front panel along the top edge of the front panel and overlying for attachment to at least a portion of the back panel when the first closure assembly is sealed for a first mailing, the first closure assembly comprising a closure panel and a first sealing panel each releasably coupled with a releasable strip;

side panels hingedly coupled with each front panel side edge disposed in overlying relation to the back panel; and a second closure assembly hingedly coupled with the back panel, the second closure assembly coupled at a fold line offset from the back panel top edge toward the bottom edge of the back panel, the second closure assembly for sealing the envelope for a second mailing;

wherein the second closure assembly comprises a second sealing panel and a removable strip, where the second sealing panel is coupled with the removable strip.

10. The envelope as recited in claim 9, wherein each side panel has a tapered top portion.

11. The envelope as recited in claim 10, wherein the closure panel has tapered edges corresponding with the tapered top portion of each side panel.

12. The envelope as recited in claim 9, wherein the first sealing panel and the second sealing panel are bound in part by a cut line to permit separation of the sealing panels from the removable strips.

13. A one-piece material blank for forming a remailable envelope therefrom, the blank comprising:

a front panel having two front panel side edges and top edge;

a back panel having two back panel side edges and a top edge;

two side panels each hingedly coupled with the front panel along the front panel side edges;

a first closure assembly hingedly coupled with the front panel along the top edge of the front panel; and a second closure assembly hingedly coupled with the back panel, the second closure assembly coupled at a fold line offset from the back panel top edge towards the front panel, the second closure assembly for sealing the envelope for a second mailing; and wherein the first closure assembly comprises a closure panel and a first sealing panel each hingedly coupled with a releasable strip therebetween.

14. The blank as recited in claim 13, where the closure panel is hingedly attached with the front panel.

15. A method for forming a remailable envelope including a front panel, a back panel, side panels, a first closure assembly including a closure panel, a second closure assembly, and a fold line offset from a top edge of the back panel, the method comprising:

folding the front panel toward the back panel;

folding the side panels hingedly attached to the front panel over the back panel;

attaching the side panels to the back panel;

folding the first closure assembly hingedly attached to the front panel over the second closure assembly hingedly attached to the back panel along the fold line offset from the top edge of the back panel, where the second closure assembly comprises a sealing panel and a releasable strip;

attaching the first closure assembly to the back panel;

releasing a portion of the first closure assembly from the back panel, where the first closure assembly includes a closure panel;

folding the closure panel of the first closure assembly away from the back panel;

folding the second closure assembly hingedly coupled with the back panel away from the front panel over a fold line which is offset from a top edge of the back panel;

folding the closure panel of the first closure assembly over a first and second support panel formed in the back panel;

folding the second closure assembly over the closure panel; and attaching the second closure assembly to the closure panel.

* * * * *